H. F. RAWLL.
SUBSCRIPTION BOOK.
APPLICATION FILED NOV. 11, 1918.
1,298,629.
Patented Mar. 25, 1919.
2 SHEETS—SHEET 1.
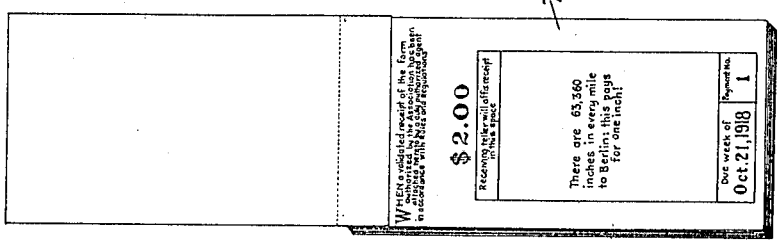
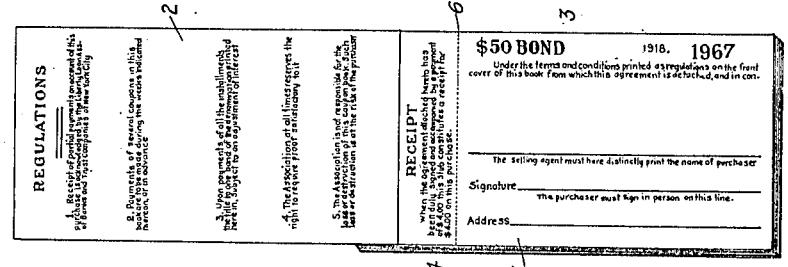
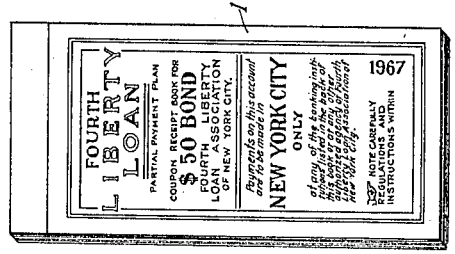
Inventor
Herbert F. Rawll
By his Attorneys H. F. RAWLL.
SUBSCRIPTION BOOK.
APPLICATION FILED NOV. 11, 1918.
1,298,629.
Patented Mar. 25, 1919.
2 SHEETS—SHEET 2.
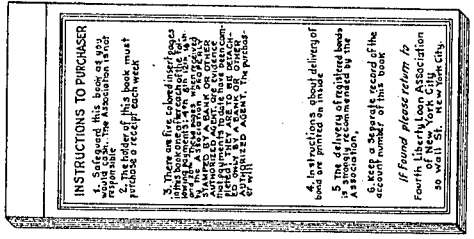
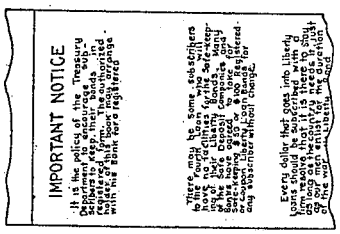
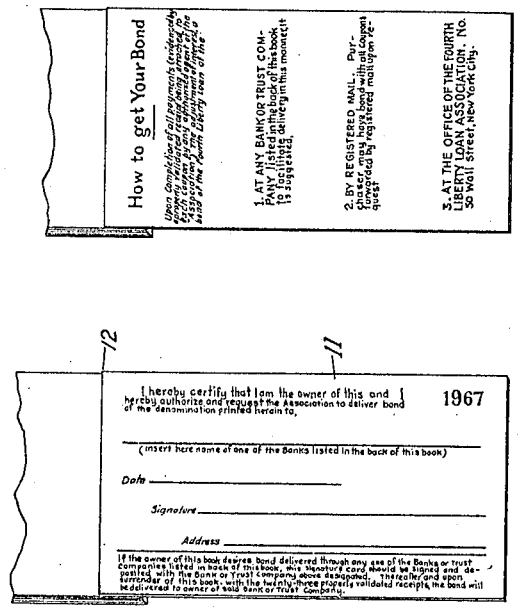
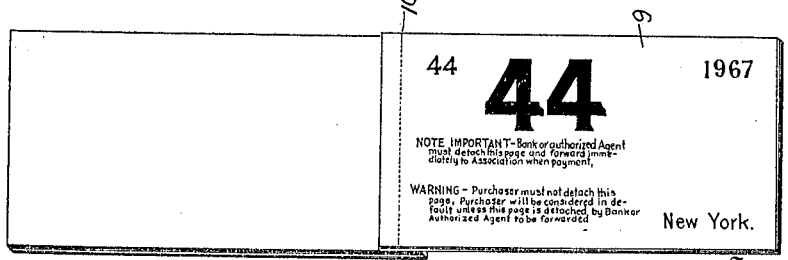

UNITED STATES PATENT OFFICE.

HERBERT F. RAWLL, OF SHORT HILLS, NEW JERSEY, ASSIGNOR TO CHRISTMAS CLUB, A CORPORATION OF NEW YORK.

SUBSCRIPTION-BOOK.

1,298,629.   Specification of Letters Patent.   Patented Mar. 25, 1919.

Application filed November 11, 1918. Serial No. 262,097.

*To all whom it may concern:*

Be it known that I, HERBERT F. RAWLL, a citizen of the United States, residing at Short Hills, in the county of Essex and State of New Jersey, have invented certain Improvements in Subscription - Books, of which the following is a specification.

In my United States Letters Patent No. 1,282,627 dated October 22nd, 1918, I have described a form of book, such as was largely used in operating a centralized system of subscription for the Third Liberty Loan, and designed to materially lessen the bookkeeping and attention required in keeping a complete and accurate record of and expediting such transactions from the time of sale of the book or beginning of the contract to the time of final delivery of the bond or subscription for each individual account. The present invention relates to an improved form of book designed to still further simplify accounting and having further advantages which will be pointed out. The invention will be best understood by description of its operation in connection with a transaction such as the Fourth Liberty Loan, for which it is largely in use, but it will be obvious that it is applicable to all transactions of a similar nature.

In operations of this class in which the aim is to effect very wide distribution within a very limited time, of a security, such as a Government bond, among all classes of people, who are to take bonds of varying denominations and in varying amounts, there are a variety of characteristics peculiar to the transaction having a value and importance beyond the ordinary. It is essential that the cost of distributing and collection be reduced to the minimum. Absolute accuracy is required as well as completeness of accounts. The speed required, the immense number of individuals and agencies employed and the lack of possibility of supplying trained bookkeeping forces to an adequate extent, requires that the bookkeeping be eliminated as far as possible and reduced to the simplest arrangements. To facilitate the issue, it has been found desirable to carry still further than has heretofore been done, the provision of means for making payments and receiving the final evidence of completion of payment in the shape of a bond or otherwise. At various points and with a minimum of trouble and expense to the subscriber, the way has been found and is herein described, of immensely extending the use of sub-agents in the taking of the burden off of the principal agents and banks and the central control office; of rendering the collections and returns absolutely secure and facilitating the delivery of the bond or evidence of completion of the transaction to bearer, whether before or after completion of the payment.

A centralized subscription system contemplates provision for payment of any part or parts of any subscription by any subscriber at a number of depositories all connected by the system to a central organization office or clearing house, and the present invention consists in a subscription book designed to facilitate the operation of such centralized system, as will more clearly appear in the following specification, reference being made to the claims for identification of the novel elements and combinations involved.

In the accompanying drawings:

Figure 1 illustrates in perspective a coupon book embodying the invention and such as was used by associations and banks in the Fourth Liberty Loan;

Fig. 2 is a perspective view of the same with the front cover open and showing the printed regulations on the rear of said cover, and the form and printing of the sheet (here forming the first sheet of the book within the cover, but not necessarily so placed), which I for convenience designate the "purchase agreement sheet", although it has a number of functions in the operation of this centralized system which are described in my former patent already referred to.

Fig. 3 is a view of the receipt stamp peculiar to the present invention;

Fig. 4 is a perspective view of the book open to show the first of a series of interior pages of the book adapted to keeping a record of fractional payments;

Fig. 5 is a similar view illustrating one of the sheets spaced through the book to facilitate a periodic accounting for accumulated payments;

Fig. 6 is a similar view, parts broken away of a sheet and an order for specific delivery of the bond or other evidence of completion of the transaction, at a specified agency;

Fig. 7 is a view of a part of the sheet or sheets containing the list of agencies forming the association;

Fig. 8 is a similar view illustrating a sheet used for promulgating the specific recommendations of the issuer of the obligation, in this case the United States Treasury;

Fig. 9 is a view of the book partly broken away, showing the inside rear cover; and Fig. 10 is a perspective view of the book showing the rear cover.

It will not be necessary in this specification to describe in detail the operation of a centralized system of subscription by fractional payments, the general plan being sufficiently set forth by Letters Patent above referred to. The present book is distinguished from that shown in the above-mentioned patent in that, in the present instance, coupons, evidencing each fractional payment are not detached from the book, and evidence of each payment is given by having the authorized payment stations attach in the proper places within the book, a proper receipt stamp for each payment as due, whereby the following results are accomplished.

All accounting records with the original subscriber are reduced to a minimum; delivery of the bond is permitted at any bank or trust company or other agency authorized by the association on presentation of a completely paid up and validated book; an absolute check is provided against all payment stations for all money received from subscribers.

The outside of the front cover 1 (Fig. 1) of the book, is preferably printed with suitable matter, including the character of the transaction, etc., in the present instance the printing being as follows: "Fourth Liberty Loan—Partial payment plan—Coupon receipt book for $50 bond—Fourth Liberty Loan Association of New York City—Payments on this account are to be made in—New York city—only—at any of the banking institutions listed in the back of this book or at any other authorized agency of Fourth Liberty Loan Association of New York City—Note carefully regulations and instructions within.—1967."

Number 1967 which here appears is the series number of the book, and identifies the account. On the inside of the front cover as shown at 2 (Fig. 2), the regulations are printed, in the present instance as follows: "1. Receipt of partial payments on account of this purchase is acknowledged by the Fourth Liberty Loan Association of New York City (hereinafter called the 'association'), only as each coupon in this book is receipted by one of its authorized agents attaching to each coupon a validated receipt of the form authorized by the association. 2. Payments of the several coupons in this book are to be made during the weeks indicated thereon, or in advance, to any one of the agencies of the association listed in the back of this book, or agencies hereafter authorized, during published receiving hours and accompanied by this book. Should any payment hereunder remain overdue and unpaid for four weeks, the purchaser shall be deemed in default and the association may, without further notice to the purchaser, sell the bond at the market price then prevailing, and after twenty-five weeks from the first due payment date specified herein, the purchaser on surrender of this book with all validated receipts and with all unpaid coupons, will receive the proceeds of the sale of the bond less expenses incurred and the amount of such unpaid coupons. 3. Upon payment of all instalments, the title to one bond of the denomination printed herein, subject to an adjustment of interest, shall vest in and delivery be made to the purchaser by the association, either at its office in New York city or at such agencies as it may designate for that purpose, on or after December 10th, 1918. The association is authorized to treat and accept the bearer of this book as the rightful owner thereof, but may require further proof of ownership. 4. The association at all times reserves the right to require proof satisfactory to it that all payments are evidenced by properly validated receipts. 5. The association is not responsible for the loss or destruction of this coupon book. Such loss or destruction is at the risk of the purchaser."

Within the cover and preferably immediately within the front cover, is provided a purchase agreement sheet 3, consisting of a stub 4 and a separable sheet or coupon 5, the removable portion or card or coupon 5 being united to the stub 4 by a perforated or otherwise weakened portion 6. Upon the removable section 10 is printed a form of subscription agreement setting forth the terms under which the subscriber makes his subscription; the printing on the present illustration being as follows: $50. Bond ——— 1918. 1967—Under the terms and conditions printed as regulations on the front cover of this book from which this agreement is detached and in consideration of a subscription by the Fourth Liberty Loan Association of New York city to a $50 bond of the Fourth Liberty Loan (in accordance with the official circular of the Secretary of the Treasury offering such loan), I hereby agree to purchase from said association one $50 bond of such loan and to make an initial payment of $4.00 on such purchase and subsequent payments on or before the dates indicated on each coupon in the book, presenting this book with each payment at any authorized agency for validation. Title to such bond is not to pass to me until the completion of such payment.

The selling agent must print here distinctly the name of purchaser.

Signature————————, Address—————

The purchaser must sign in person on this line.

There is preferably printed in different ink from that of the body of the printing on this card an amount, in this instance four dollars to indicate at a glance the amount of the initial payment required for the specific bond called for by this book, in this case a $50. bond. It will be noted that the card includes a notice of the denomination of the bond subscribed for, the serial number which identifies it with the particular account which corresponds to the number on the outside front cover of the book; a space is provided for the signature of the purchaser and for the placing of his address and preferably a space for the careful printing of the name of the purchaser by the selling agent, to avoid errors due to misreading of the signature. The stub to which the purchase agreement card is attached is printed to indicate that when the card is detached, the stub constitutes a receipt for the initial payment of the purchase price of the bond being purchased, in this case the initial payment of $4.00 on a $50. bond or the initial payment of the deposit out of the total agreed upon. The language here shown is as follows: "Receipt—When the agreement attached hereto has been duly signed and accompanied by a payment of $4.00, this stub constitutes a receipt for $4.00 on this purchase."

The main body of the book is principally made up of a series of pages illustrated at 7 (Fig. 4) upon which is printed the amount of a single fractional payment, in this case $2.00, the date when such payment is due, as for example, the statement "Payment is due weekly—1st week, 2nd week, etc.," or "Payment No. 1, Payment No. 2, etc." coupled with a suitable direction in the regulations part of the book as "Payments are due weekly;" or as here shown, the statement of the precise dates when due, as "Due week of October 21st, 1918, etc.," and the serial number of the payment, in the present case "Payment No. 1." These numbers will run from 1 up to 23 or other number, depending upon the number of fractional payments necessary to complete with the initial payment provided for by the purchase agreement sheet, payment for the bond, amount or other sum which is called for to complete the transaction. Upon this sheet is also printed a direction for the method of use, for instance "When a validated receipt of the form authorized by the association has been attached hereto by a duly authorized agent in accordance with rules and regulations printed in this book, this coupon will constitute a receipt for the amount printed below." A space is provided for the affixing of a receipt to indicate that the particular fractional payment called for at the date indicated has been duly made. The system especially contemplates the use of a separate gummed or pasted receipt stamp, shown at 8 (Fig. 3) which is to be applied by the receiving agent whenever the payment called for is made, the stamp being placed upon the space provided therefor, immediately below or over and below the printed direction "Receiving teller will affix receipt in this space." The receipt form shown in Fig. 3 is especially designed to identify it with the transaction. In the present instance it is besides appropriate ornamentation, printed with the words "This certificate when attached to partial payment plan coupon book represents a payment of $2.00 on a purchase of a $50 Fourth Liberty Loan bond, Fourth Liberty Loan Association of New York City," and the serial number of the receipt stamp itself, in this case "999,829." Within the space adapted to be covered by the receipt stamp, suitable advertising matter may be printed.

The receipt stamp as shown in Fig. 3, may be used by being simply pasted on and without the use of any additional validating mark, or may have stamped upon it by the agency which applies it to the book a special validating stamp, as for example that shown at the bottom of Fig. 3 "Validated ——— National Bank, New York." These receipt stamps may be printed or engraved separately or be printed in large numbers on sheets or ribbons provided with suitable lines of separation as with ordinary postage stamps, with or without the date.

It is desirable that there shall be periodic reports to the central office of the association handling the loan in any locality. For this purpose there are inserted at spaced intervals within the book, a series of sheets, each of which shows the sum of the several payments theretofore made, as evidenced by the purchase agreement sheet stub, plus the several receipt stamps preceding such inserted sheet. For example, immediately following payment number 4 sheet, there will be such an accounting sheet indicating that $12. has been paid, this being the sum of the amounts represented by the purchase agreement sheet and immediately preceding stamped receipt sheets 1, 2, 3 and 4. After payment number 8 sheet, the account sheet will show that $20. has been paid; after number 12 that $28. has been paid, and so on, until every payment including number 20 has been paid, when the account sheet will show that $44. has been paid. The last mentioned sheet is chosen for illustration in Fig. 5 and is shown at 9. This sheet 9 has at the upper right hand corner, the number 1967 or other number identifying it with the account, the number 44 to indicate the sum of the payments to date and preferably the same amount printed as an index number. Also preferably the words "Note important—Bank or authorized agent must detach this page and forward immediately to association when payment number 20 and all preceding payments have been made. Warning—Purchaser must not detach this page. Purchaser will be considered in default unless this page is detached by bank or authorized agent to be forwarded to the association as above. New York."

The card 9 has a perforated or weakened line 10 joining it to the stub whereby it is fastened to the book so that the card may be detached by the receiving agent and sent to the central office. It is not necessary to have any account card or sheet in this instance beyond the payment representing $44, as the payment of the next three amounts of $2.00 each will enable the closing of the transaction and delivery of the bond. At a convenient point in the book, preferably toward the rear of the book, because it has to do with the completion of the transaction, there is provided a sheet or card 11 joined to its stub on the weakened or perforated line 12 so that it may be torn from the book, and which has printed upon it the number 1967 or other number identifying it with the account. This card is intended to provide that the purchaser may order the delivery of the bond to him by a specified one of the agencies, from the association, and is printed as follows: "I hereby certify that I am the owner of this book and I hereby authorize and request the association to deliver bond of the denomination printed herein, to Insert here name of one of the banks listed in the back of this book Date———, Signature———, Address———

If the owner of this book desires bond delivered through any one of the banks or trust companies listed in the back of this book, this signature card should be signed and deposited with the bank or trust company above designated. Thereafter, and upon surrender of this book, with the twenty-three properly validated receipts, the bond will be delivered to owner at said bank or trust company."

It will be seen that there is a space provided for the particular name of the agency selected by the purchaser to deliver the bond, the date, the signature which identifies the owner with the original purchaser, and his address. This card, on being filled out and signed, torn out of the book and forwarded to the central office, and there, if necessary, compared with the original purchase agreement sheet, will enable the delivery of the bond to the purchaser at the specified agency on completion of the payments and also provides a ready means for doing the business on a "bearer" basis, for the purchaser on properly signing this sheet and delivering the book with its contained receipt stamps to a purchaser from him, will enable, if such course be approved in any individual case, the delivery of the bond to bearer.

Arranged within the book, preferably near the end, is a list of the agencies forming the association, or authorized to receive payments, such as the banks forming the association and if desired, the United States sub-post offices or other offices, the beginning of such a list being indicated at 13 in Fig. 7. Opposite each agent's name is printed its station number, as 1, 2, 3, etc., as indicated at 14. Fig. 8 indicates a sheet or one of a series of sheets bound in the book containing suitable propaganda or other matter that may be arranged for by the obligor, in this case, the U. S. Treasury.

On the inside of the rear cover of the book are printed instructions as to the ways of completing the transaction or getting the bond, the printing in this instance, being as follows: "How to get your bond"—"Upon completion of all payments (evidenced by a properly validated receipt being attached to each coupon by any authorized agent of the 'association') and adjustment of interest, a bond of the Fourth Liberty Loan of the denomination printed herein, will be delivered to the holder of this book upon surrender thereof with twenty-three validated receipts attached in one of the following ways:

"1. At any bank or trust company listed in the back of this book. To facilitate delivery in this manner, it is suggested that the owner of this book comply with the instructions on the signature card following the page after payment No. 23 in this book.

"2. By registered mail. Purchaser may have bond with all coupons forwarded by registered mail upon request to the association at No. 50 Wall street, for the form and statement covering postal fee and insurance, and adjustment of interest.

"3. At the office of the Fourth Liberty Loan Association, No. 50 Wall street, New York city."

On the outside of the rear cover are printed instructions to purchaser as follows:

"1. Safeguard this book as you would cash. The association is not responsible for its loss or destruction.

"2. The holder of this book must purchase a recept each week (unless payments have been made in advance) from one of the authorized agents of the association and have it securely attached to the proper page in this book. If receipts are lost their value cannot be recovered.

"3. There are five colored insert pages in this book, one after each of the following payments: 4th, 8th, 12th, 16th and 20th. These pages, when received by the association, properly stamped by a bank or other authorized agent, are evidence that payments to date have been completed; they are to be detached only by a bank or other authorized agent. The purchaser will be considered in default unless these pages are received by the association as the designated payments become due. In accordance with the regulations on the inside front cover of this book, the association reserves the right to sell the bond represented hereby, if the purchaser is in default.

"4. Instructions about delivery of bond are printed on inside back cover.

"5. The delivery of registered bonds is strongly recommended by the association for the protection of the purchaser.

"6. Keep a separate record of the account number of this book for your use in case of loss.

" If found please return to
Fourth Liberty Loan Association
of New York City
50 Wall street, New York city."

In operating under this plan for obtaining subscriptions for, let us say, the Fourth Liberty Loan, in which bonds of various denominations were to be issued with as wide a distribution as possible, a central committee or headquarters is established for each city or section, for example, the Fourth Liberty Loan Association of New York City, being an organization of all the banks or other agencies in the section agreeing to operate in accordance with this plan and having a direct relation with the U. S. Treasury or its officers. This association establishes headquarters for taking care of the accounts and issues the subscription books of the required denominations to its members, charging them with an amount equal to the number of books multiplied by the amount of the preliminary payment represented by the purchase agreement sheet, in case of a $50. book for instance, the sum of $4.00 for each book. The central office also sells and delivers to the various agents, a number of receipt stamps for example, $10,000 worth of stamps to an agent, receiving the amount thereof in cash or credit, that is to say, an appropriate number of receipt stamps is delivered to the bank and the bank's account charged with the amount represented by such stamps and no further record is necessary. These stamps may be sold by the bank or other agency to sub-agents in quantity; for example, to a customer, a large employer, charging them to his account with the bank and this employer then becomes a sub-agent, disposing of the stamps to his employees or affixing the stamps to their books from time to time, as called for by the terms of payment. The increase in the number of sub-agencies which may be created without increasing the bookkeeping with its effect on facilitating the business of distribution and accounting, will be apparent.

When a subscriber to a bond, for example a $50. bond, goes to one of these agencies, the list of which is printed in the book, as indicated in Fig. 7, the agency, having selected a coupon book of the proper denomination, secures the signature of the subscriber to the purchase agreement card, which, on being properly filled out is torn out of the book and the book delivered to the subscriber, the subscriber at the same time paying the initial payment of, in this case $4.00. The purchase agreement card is mailed by the receiving agent to the headquarters of the association, together with all other such cards lifted during the day or other period of accounting and also with a check covering the amount of the initial payments received to date, unless the arrangement has been followed which is stated above, of payment in advance by the agency for the total of the initial payments represented by the books delivered to each. The book delivered to the subscriber with this purchase agreement card removed, is evidence of the starting of his account and the payment of the initial subscription.

In the plan of operation which has been followed in practice, a large number of soliciting agents, additional to those listed in the books have been employed for selling subscriptions, these mere soliciting agents' function being completed when the obtaining of subscription, and the initial payment and delivery of the book are completed and all subsequent transactions take place directly or indirectly with the officially named agencies listed in the book. The several functions of the purchase agreement sheet in the present case, is similar to those of the similar sheet in my preceding Letters Patent.

The account having been started, as above indicated, the subscriber from time to time makes the payments indicated on the successive payment sheets of the amount called for by the successive sheets at any one of the agencies specified in the list indicated at Fig. 7, the receiving agency in each case applying to the proper payment sheet one of the receipt stamps shown in Fig. 3 and may at the same time, especially validate said stamp by printing over it or adjacent to it the matter shown at the bottom of said figure. As soon as four, or other predetermined number of receipt stamps have been applied, the agency receiving the fourth will detach the account sheet, for example, the sheet shown at 9 in Fig. 5 and mail it to the central office, so that the central office is able to keep account, by associating these sheets with the corresponding purchase agreement sheet, of the condition of each individual account and as to whether it is fully paid up to date or in default.

At any time, or any time specified in the regulations, the purchaser, on filling out, detaching and mailing to the central office, the form shown at 11 in Fig. 6, may provide for the delivery of the bond or evidence of completion of the transaction at a selected agency, or he may follow the other alternatives set forth in the sheet shown in Fig. 9, in this case printed on the inside of the rear cover of the book.

Upon presentation of the book with all proper receipt stamps attached thereto, in accordance with these instructions, the subscriber will immediately receive his bond.

It will be noticed that in this arrangement the minimum of intelligent bookkeeping is required; that the association and the obligor receive the cash in advance; that an employer or sub-agent may go to any bank or other agency and purchase any quantity of receipt stamps which may be needed for the current week or current month, and attach them to the books of his employees or persons whom he represents and in this way thousands of authorized agencies are created, thereby relieving the banks of the enormous burden of serving purchasers individually and on repeated occasions, when payments are to be made; also that the convenience of the purchase is observed by arranging convenient locations for payment and for the delivery of the bond at any selected agency.

I claim:—

1. In a subscription book for use in a centralized system of partial payment subscriptions, having a central accounting office and a number of receiving agencies, at any one of which agencies payments are to be made, said book having a detachable purchase agreement sheet showing the terms of agreement and having an indicated place for signature of the subscriber and provided with marks to identify it with said book, a series of sheets provided with means for indicating successive partial payments on account of the total predetermined subscription, and a series of accounting means detachably secured in the book, provided with a legend indicating that the means must be detached by a receiving agency and forwarded to the accounting office, and bearing matter to indicate that a certain number of payments indicated by the preceding partial payment sheets have been made, said accounting means having marks identifying them with the book.

2. In a subscription book for use in a centralized system of partial payment subscriptions, having a central accounting office and a number of receiving agencies, at any one of which agencies payments are to be made, said book having a detachable purchase agreement sheet showing the terms of agreement and having an indicated place for signature of the subscriber and provided with marks to identify it with said book, a series of permanently attached sheets provided with indicated spaces wherein may be applied means to show successive partial payments on account of the total predetermined subscription, and a series of accounting means detachably secured in the book, provided with a legend indicating that the means must be detached by a receiving agency and forwarded to the accounting office, and bearing matter to indicate that a certain number of payments indicated by the preceding partial payment sheets have been made, said accounting means having marks identifying them with the book.

3. In a subscription book for use in a centralized system of partial payment subscriptions, having a central accounting office and a number of receiving agencies, at any one of which agencies payments are to be made, said book having a detachable purchase agreement sheet showing the terms of agreement, having an indicated place for signature of the subscriber and having marks to identify it with said book, a series of permanently attached sheets on which are indicated the locations where a predetermined number of receipt stamps for successive partial payments are to be attached, a series of accounting means detachably secured in the book, provided with a legend indicating that the means must be detached by a receiving agency and forwarded to the accounting office, and bearing matter to indicate that a certain number of payments have been made, said accounting means having marks identifying them with the book, and suitable standardized receipt stamps issuable at any one of said agencies and each constituting, when affixed in the proper indicated spaces in said book, a valid receipt for any partial payment on account of any subscription of the same series.

4. In a subscription book for use in a centralized system of partial payment subscriptions, having a central accounting office and a number of receiving agencies, at any one of which agencies payments are to be made, said book having a detachable purchase agreement sheet showing the terms of agreement, having an indicated place for signature of the subscriber and having marks to identify it with said book, a series of permanently attached sheets on which are indicated the locations where a predetermined number of receipt stamps for successive partial payments are to be attached, and indications in connection with each space of the amount of partial payment due and the due date, a series of accounting means detachably secured in the book, provided with a legend indicating that the means must be detached by a receiving agency and forwarded to the accounting office, bearing matter to indicate that a certain number of payments have been made, said accounting means having marks indicating the sequential order in which said means are to be detached from the book and identifying them with the book, each of said accounting means being located in the book between the sheet on which the receipt stamp for the last payment accounted for by said accounting means is affixed and the next subsequent sheet, and suitable standardized receipt stamps issuable at any one of said agencies and each constituting, when affixed in the proper indicated spaces in said book, a valid receipt for any partial payment on account of any subscription of the same series.

HERBERT F. RAWLL.

Copies of this patent may be obtained for five cents each, by addressing the "Commissioner of Patents, Washington, D. C."